(12) United States Patent
Huang (10) Patent No.: US 8,079,653 B2
(45) Date of Patent: Dec. 20, 2011

(54) SLIDING TRACK ASSEMBLY (75) Inventor: Kuo-Sheng Huang, Taipei County (TW)

(73) Assignee: Nan Juen International Co., Ltd, Taipei County (TW)

( * ) Notice: Subject to any disclaimer, the term of this patent is extended or adjusted under 35 U.S.C. 154(b) by 212 days.

(21) Appl. No.: 12/499,086

(22) Filed: Jul. 7, 2009

(65) Prior Publication Data
US 2011/0007988 A1 Jan. 13, 2011

(51) Int. Cl.
*A47B 95/00* (2006.01)
(52) U.S. Cl. .................................. 312/333; 312/334.44
(58) Field of Classification Search ......... 312/334.44–334.47, 333, 334.7, 312/334.8; 384/21
See application file for complete search history.

(56) References Cited

U.S. PATENT DOCUMENTS

| | | | | |
|---|---|---|---|---|
| 5,207,781 | A * | 5/1993 | Rock | 312/319.1 |
| 6,926,377 | B2 * | 8/2005 | Lammens et al. | 312/333 |
| 6,971,729 | B1 * | 12/2005 | Kim et al. | 312/319.1 |
| 7,077,487 | B2 * | 7/2006 | Yang | 312/333 |
| 7,104,691 | B2 * | 9/2006 | Chi | 384/21 |
| 7,244,005 | B1 * | 7/2007 | Lu | 312/333 |
| 7,347,515 | B1 * | 3/2008 | Lu | 312/333 |
| 7,374,261 | B1 * | 5/2008 | Wang | 312/333 |
| 7,465,000 | B2 * | 12/2008 | Huang | 312/333 |
| 7,600,828 | B2 * | 10/2009 | Chen et al. | 312/333 |
| 7,758,134 | B2 * | 7/2010 | Huang | 312/334.47 |
| 7,815,267 | B1 * | 10/2010 | Frousiakis | 312/333 |
| 7,878,606 | B2 * | 2/2011 | Chen et al. | 312/333 |
| 7,914,093 | B2 * | 3/2011 | Huang | 312/333 |
| 2004/0183411 | A1 * | 9/2004 | Boks | 312/333 |
| 2004/0207300 | A1 * | 10/2004 | Chen et al. | 312/333 |
| 2005/0184629 | A1 * | 8/2005 | Yang | 312/334.4 |
| 2006/0082266 | A1 * | 4/2006 | Le et al. | 312/319.1 |
| 2007/0001562 | A1 * | 1/2007 | Park | 312/333 |
| 2007/0090735 | A1 * | 4/2007 | Hashemi et al. | 312/334.46 |
| 2007/0132346 | A1 * | 6/2007 | Huang | 312/333 |
| 2007/0284976 | A1 * | 12/2007 | Huang | 312/220 |
| 2008/0111456 | A1 * | 5/2008 | Huang | 312/334.5 |
| 2008/0136300 | A1 * | 6/2008 | Wang | 312/319.1 |
| 2008/0150408 | A1 * | 6/2008 | Hsieh | 312/334.4 |
| 2008/0197759 | A1 * | 8/2008 | Chen et al. | 312/334.1 |
| 2008/0211366 | A1 * | 9/2008 | Brock et al. | 312/333 |
| 2009/0115300 | A1 * | 5/2009 | Chen et al. | 312/334.1 |
| 2009/0160299 | A1 * | 6/2009 | Chen et al. | 312/334.44 |
| 2009/0278430 | A1 * | 11/2009 | Liang et al. | 312/319.1 |
| 2011/0001412 | A1 * | 1/2011 | Zimmermann | 312/334.12 |
| 2011/0043087 | A1 * | 2/2011 | Shih et al. | 312/334.1 |

* cited by examiner

*Primary Examiner* — Darnell Jayne
*Assistant Examiner* — Hiwot Tefera (57) ABSTRACT

A sliding track assembly includes an inner slide rail with a circulating guide groove, a slide block supported on and movable along the inner slide rail, a positioning block set that has a guide rod coupled to the circulating guide groove of the inner slide rail and a positioning rod inserted through the slide block, an intermediate slide rail unit having a first intermediate slide rail member movable by the slide block and a second intermediate slide rail member mounted in the first intermediate slide rail member and a locating block mounted in the second intermediate slide rail member adjacent to the slide block, the locating block having a transverse groove for receiving the positioning rod of the slide block to hold the slide block in position, and an outer slide rail unit receiving the inner slide rail unit and the intermediate slide rail unit.

3 Claims, 9 Drawing Sheets

SLIDING TRACK ASSEMBLY

BACKGROUND OF THE INVENTION

1. Field of the Invention

The present invention relates to a sliding track assembly for controlling positioning of a movable object in a fixed object between a close position and an open position and more particularly, to such a sliding track assembly, which is repeatedly pressable to control positioning of a positioning block in a circulating guide groove.

2. Description of the Related Art

Sliding boxes and drawers are used with sliding track assemblies in cabinets and storage devices for storing things. By means of sliding track assemblies, sliding boxes or drawers can be smoothly moved in and out of cabinets or storage device. A sliding track assembly may be equipped with a buffer mechanism to buffer the movement of the sliding box or drawer that is pushed toward the inside of the cabinet or storage device, avoiding impact and eliminating noises. This buffer mechanism may be used with spring members to provide an auto return effect.

A sliding track buffer mechanism is known comprising holder block located on the front side of a bottom rail, a sleeve located on the rear side of the holder block at the top, an impact damper positioned in the front side of holder block and connected between the sleeve and the holder block. When closing the sliding track assembly, the sleeve is moved at the top side of the holder block to compress the impact damper, and the closing operation is done when the sleeve is abutted against the front contact face of the holder block.

The aforesaid technique can buffer the impact when closing the sliding box or drawer. However, because there is a certain distance between the front side of the holder block through the sleeve to the inner slide rail of the sliding track assembly, the travel path of the sliding box or drawer is limited. Further, during installation of the sliding track assembly, the component parts of the sliding track assembly must be separately mounted in the bottom rail. This mounting procedure is complicated, wasting much labor and time and lowering the product yield rate.

SUMMARY OF THE INVENTION

The present invention has been accomplished under the circumstances in view. It is the main object of the present invention to provide a sliding track assembly, which provides a special component parts mounting design that facilitates fabrication of the sliding track assembly, saves much installation labor and time of the sliding track assembly, and improves the product yield rate.

It is another object of the present invention to provide a sliding track assembly, which greatly prolongs the travel path of the movable external object that is affixed to the intermediate slide rail unit thereof.

To achieve these and other objects of the present invention, a sliding track assembly comprises an outer slide rail unit, an inner slide rail unit mounted in the outer slide rail unit and an intermediate slide rail unit mounted in the outer slide rail unit. The inner slide rail unit comprises a mounting plate, an inner slide rail extended from the mounting plate and having a circulating guide groove, a slide block supported on and movable along the inner slide rail and having a locating hole, and a positioning block set between the slide block and the inner slide rail and repeatedly pressable to position in a predetermined position in the circulating guide groove and to slide in the circulating guide groove, the positioning block having a guide rod protruded from one side thereof and coupled to the circulating guide groove of the inner slide rail and a positioning rod protruded from an opposite side thereof and inserted through the locating hole of the slide block. The intermediate slide rail unit is supported on one end of the slide block opposite to the mounting plate. Further, the intermediate slide rail unit comprises a first intermediate slide rail member movable by the slide block and a second intermediate slide rail member mounted in the first intermediate slide rail member and a locating block mounted in the second intermediate slide rail member adjacent to the slide block, the locating block having a transverse groove for receiving the positioning rod of the slide block to hold the slide block in position, and an outer slide rail unit, which receives the inner slide rail unit and the intermediate slide rail unit.

DETAILED DESCRIPTION OF THE PREFERRED EMBODIMENT

Referring to FIGS. 1~4, a sliding track assembly in accordance with the present invention is shown comprising an inner slide rail unit 1, and intermediate slide rail unit 2 and an outer slide rail unit 3.

Figure 1:
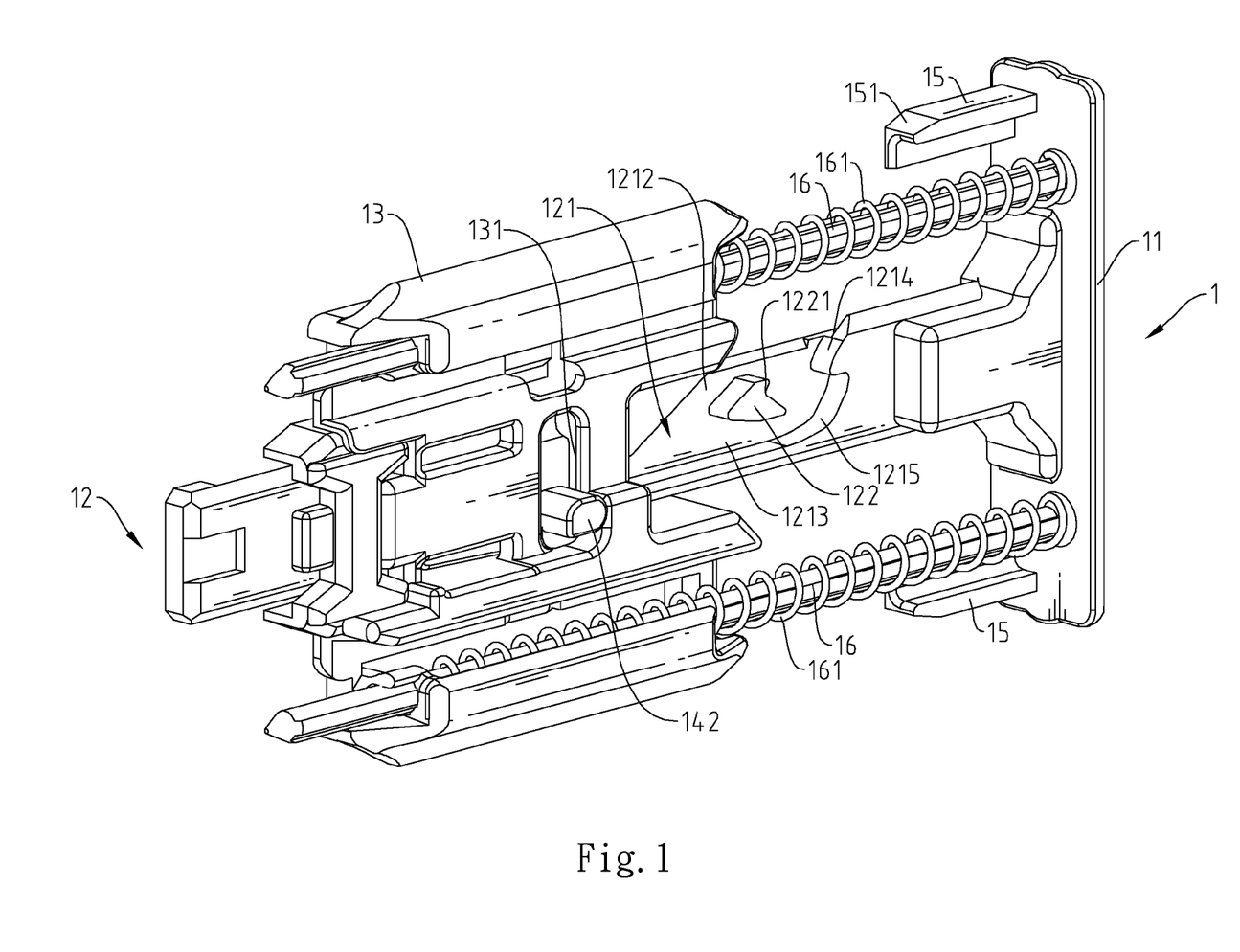
FIG. 1 is an oblique elevation of a sliding track assembly according to the present invention.
Figure 2:
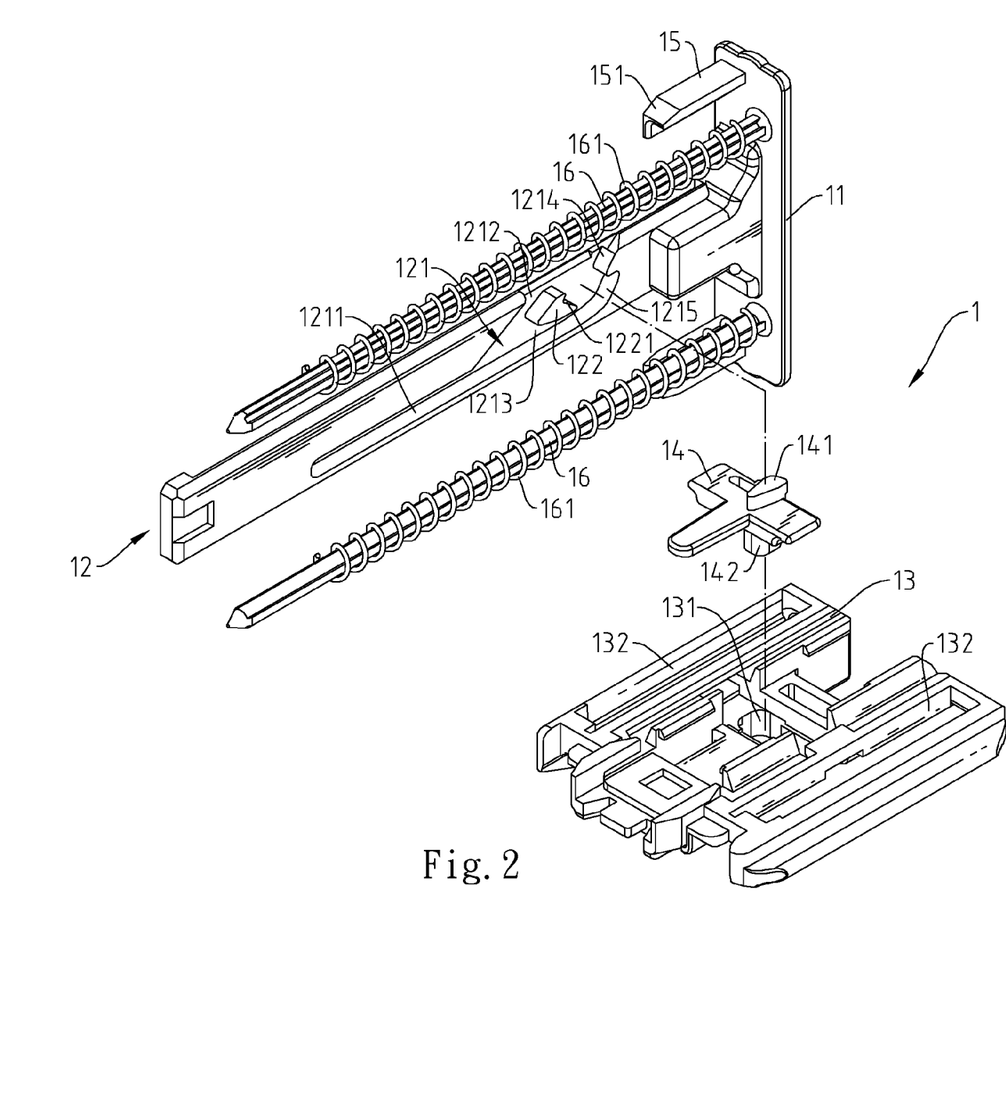
FIG. 2 is an exploded view of the inner slide rail unit of the sliding track assembly according to the present invention.

The inner slide rail unit 1 comprises: a mounting plate 11; an inner slide rail 12, which extends perpendicularly from one side of the mounting plate 11 and which has a circulating guide groove 121 that is located on one side thereof and has a longitudinal sliding groove portion 1211 that extends longitudinally in direction reversed to the mounting plate 11 and a first sliding groove portion 1212 and a second sliding groove portion 1213 respectively extended from one end of the longitudinal sliding groove portion 1211 toward to the mounting plate 11 and then merged in each other, a locating block 122 that is protruded from one side thereof and surrounded by the first sliding groove portion 1212 and the second sliding groove portion 1213 and has a recessed portion 1221 facing the mounting plate 11, and a first guide face 1214 and a second guide face 1215 respectively disposed in the first sliding groove portion 1212 and the second sliding groove portion 1213 adjacent to the merged area between the first sliding groove portion 1212 and the second sliding groove portion 1213; two locating bars 15 perpendicularly extended from the mounting plate 11 and disposed in a parallel manner at two sides relative to the inner slide rail 12, each locating bar 15 having a guide face 151; two guide rods 16 perpendicularly extended from the mounting plate 11 and disposed in a parallel manner between the locating bars 15 and two opposite lateral sides of the inner slide rail 12; two spring members 161 respectively sleeved onto the guide rods 16; a slide block 13, which is movably set between the two guide rods 16 and supported on the spring members 161 against the mounting plate 16 and which has a locating hole 131 located on the middle between the sliding grooves 132 and cut through the inner and outer walls thereof and two sliding grooves 132 longitudinally arranged in parallel at two sides relative to the locating hole 131 and respectively coupled to the guide rods 16 to guide sliding movement of the slide block 13 along the guide rods 16; and a positioning block 14, which is set between the slide block 13 and the inner slide rail 12, having a guide rod 141 protruded from one side thereof and coupled to the circulating guide groove 121 of the inner slide rail 12 and a positioning rod 142 protruded from the other side thereof and inserted through the locating hole 131 of the slide block 13.

Figure 3:
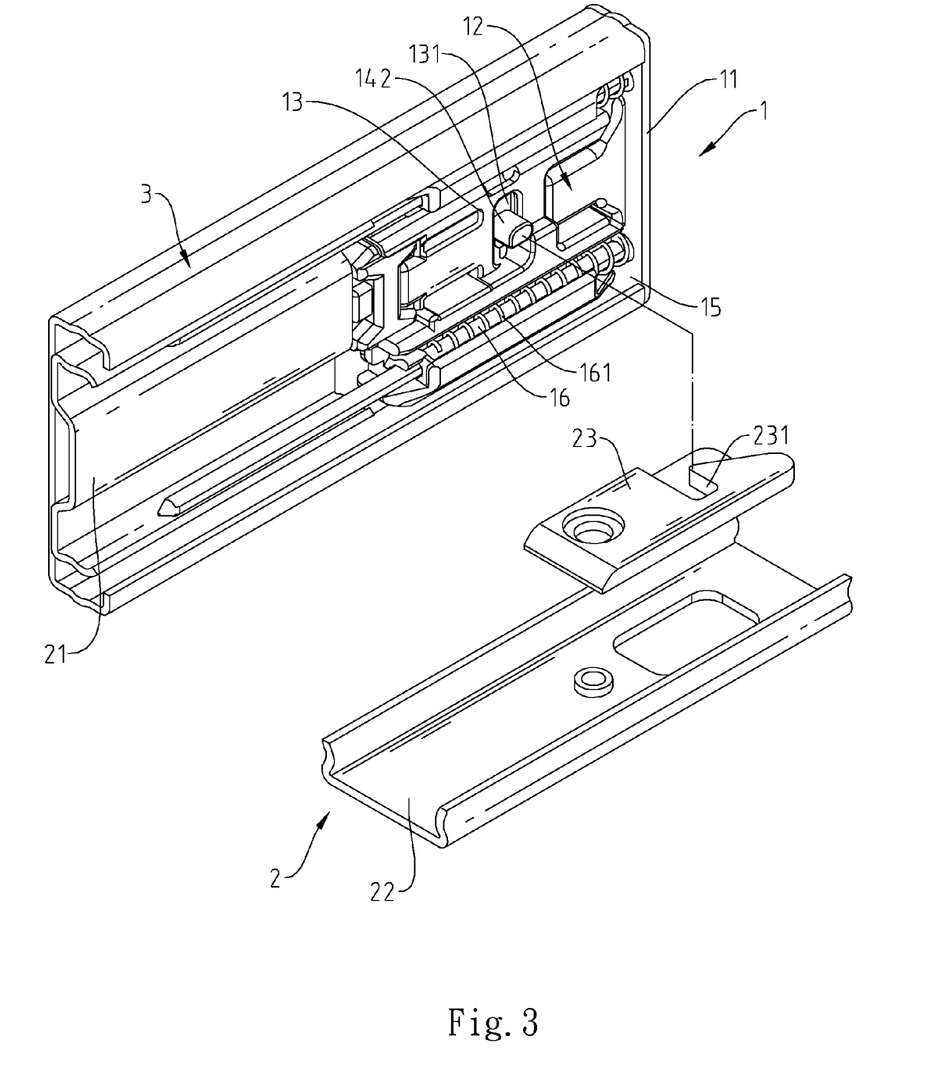
FIG. 3 is an exploded view of a part of the sliding track assembly according to the present invention.

The intermediate slide rail unit 2 comprises a first intermediate slide rail member 21, a second intermediate slide rail member 22 slidably mounted in the first intermediate slide rail member 21 and affixed to an external object (not shown), and a locating plate 23 connected to one end of the second intermediate slide rail member 22. The locating plate 23 defines therein a transverse groove 231.

During installation, the intermediate slide rail unit 2 is inserted into the inside of the outer slide rail unit 3, and then the inner slide rail unit 1 is inserted in between the outer slide rail unit 3 and the intermediate slide rail unit 2 to have the mounting plate 11 of the inner slide rail unit 1 be disposed outside one end of the outer rail 3. Thereafter, moving the mounting plate 11 toward the associating end of the outer slide rail unit 3 to force the guide faces 151 of the locating bars 15 over the inner surfaces of the two opposite sidewalls of the outer slide rail unit 3 and to have the two locating bars 15 be further forced into the inside of the outer slide rail unit 3 and respectively abutted against the inner surfaces of the two opposite sidewalls of the outer slide rail unit 3. Thus, the sliding track assembly is well assembled.

Figure 4:
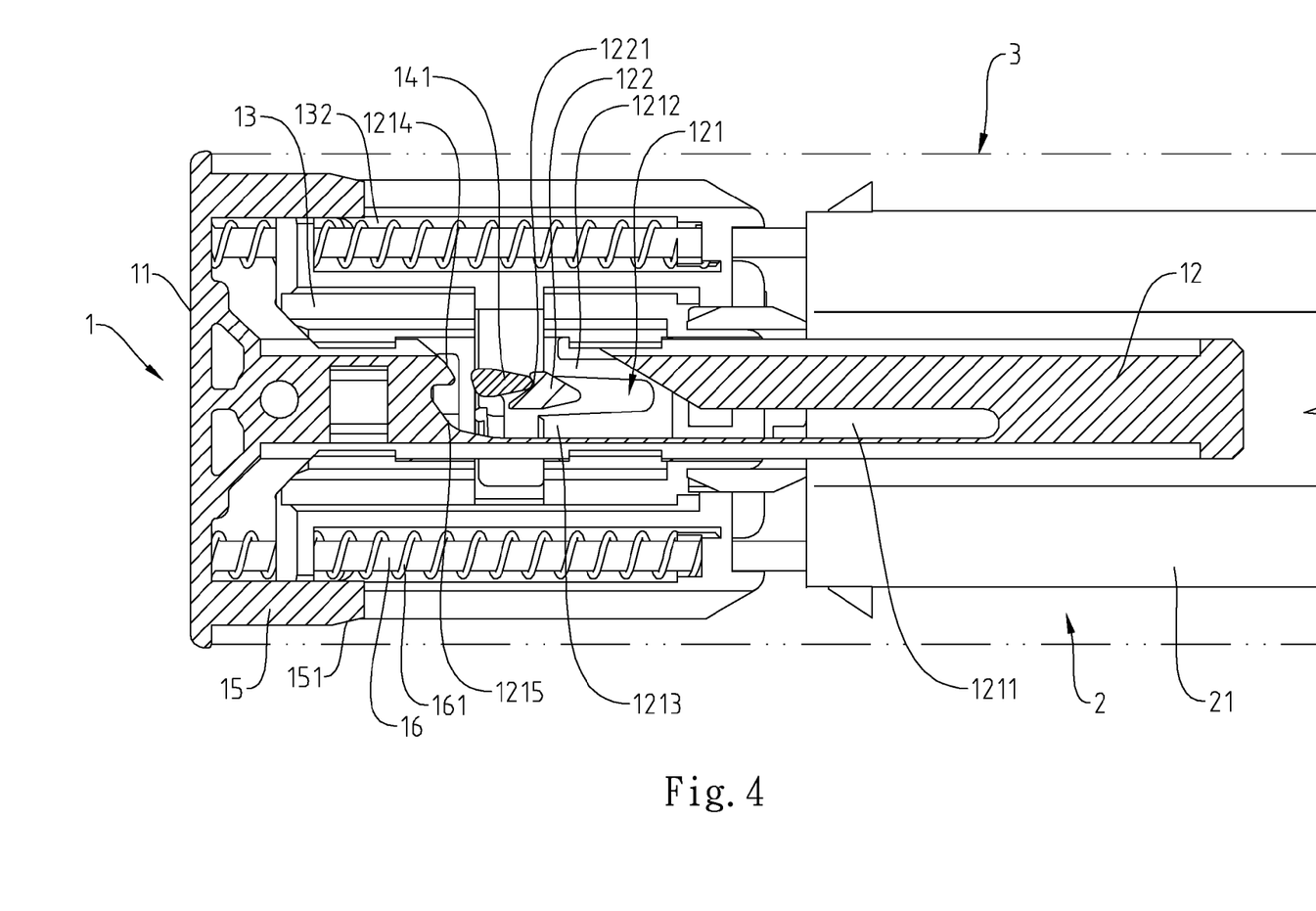
FIG. 4 is a sectional view of the present invention, showing the sliding track assembly in the close position.
Figure 5:
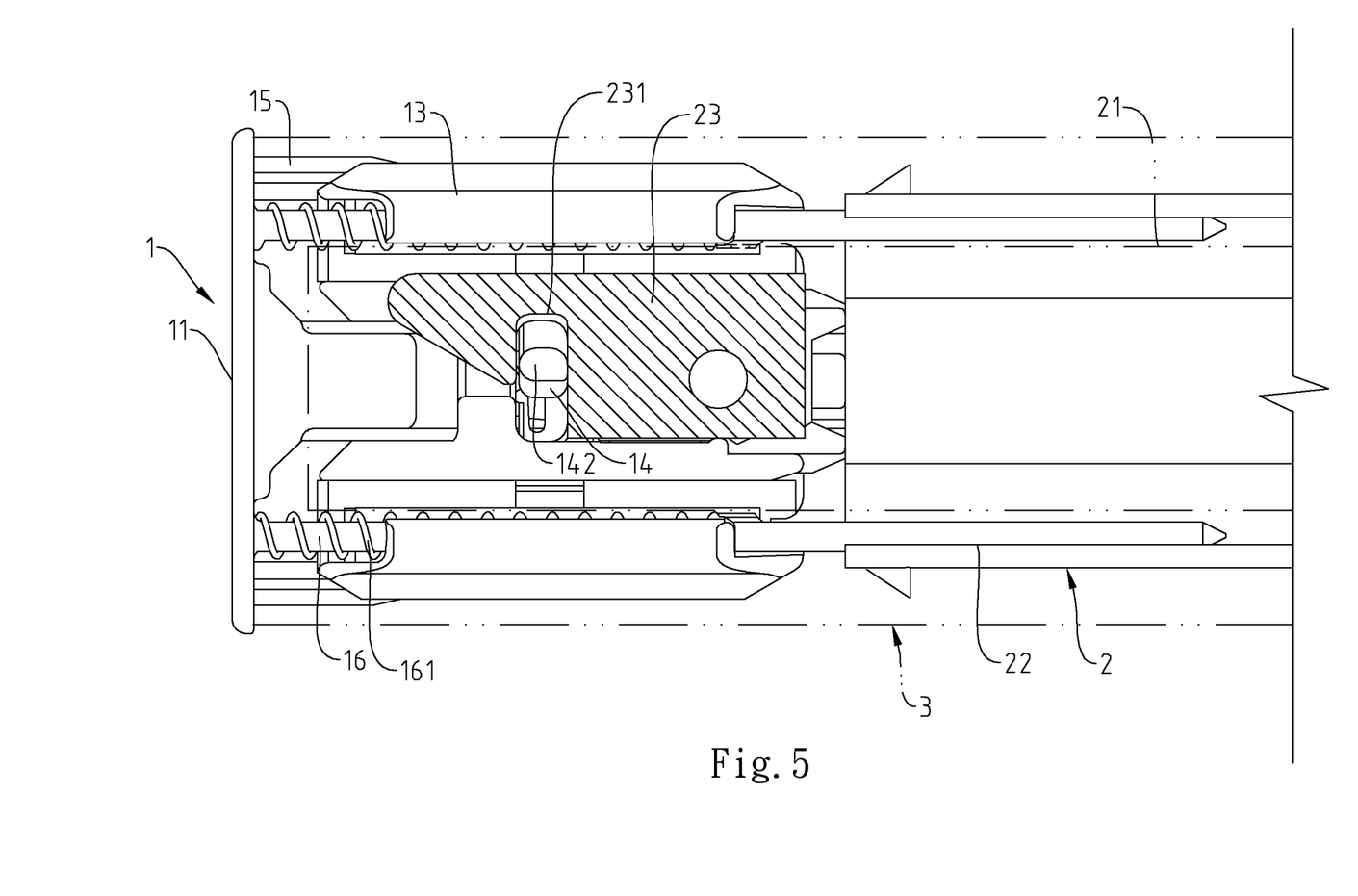
FIG. 5 is a schematic sectional view of the present invention, showing the positioning of the locating plate when the sliding track assembly closed.

Referring to FIGS. 4 and 5, when the sliding track assembly is closed, the guide rod 141 of the positioning block 14 is positioned in the recessed portion 1221 of the locating block 122 of the inner slide rail 12. Because the positioning rod 142 of the positioning block 14 is inserted through the locating hole 131 of the slide block 13, the slide block 13 is disposed close to the mounting plate 11 to compress the spring members 161, and the positioning rod 142 of the positioning block 14 is positioned in the transverse groove 231 of the locating block 23 to stop the second intermediate slide rail member 22 from moving in direction away from the mounting plate 11, and therefore the external object that is fastened to the second intermediate slide rail member 22 is locked in position.

Figure 6:
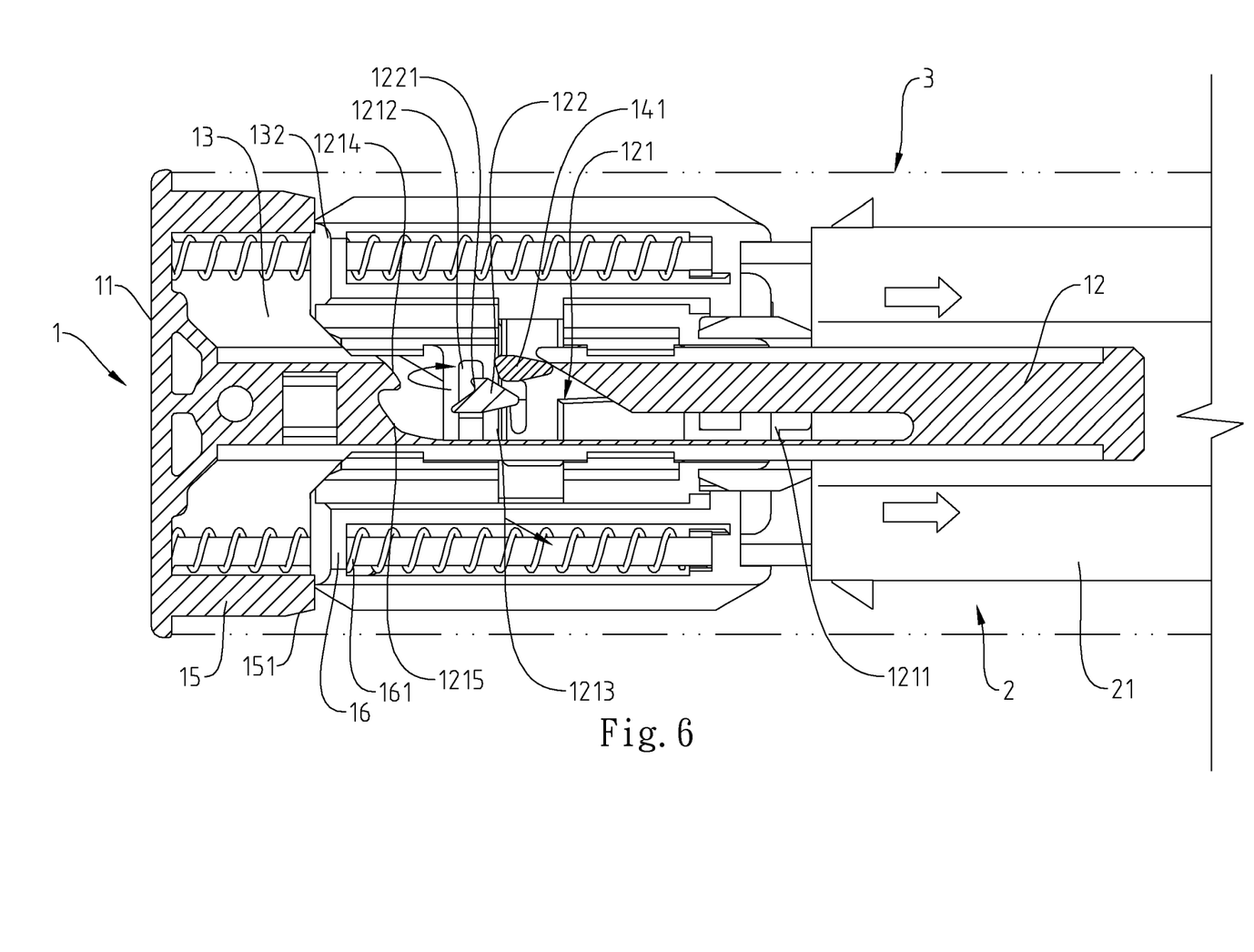
FIG. 6 is a schematic sectional view of the present invention, showing the positioning of the inner slide rail unit during open operation of the sliding track assembly.
Figure 7:
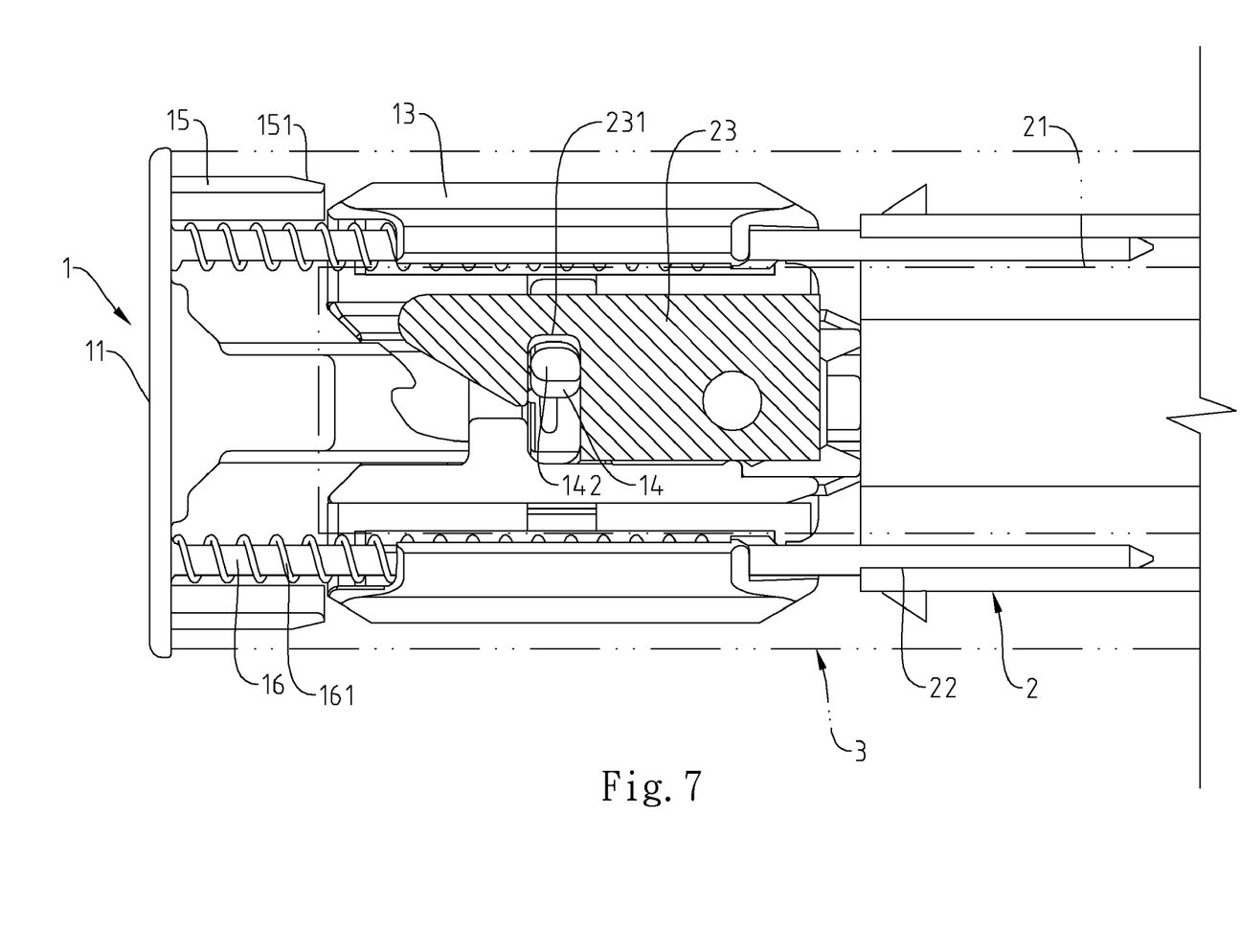
FIG. 7 is a schematic sectional view of the present invention, showing the positioning of the locating plate during open operation of the sliding track assembly.

Referring to FIGS. 6 and 7, when the user wishes to pull the external object that is affixed to the second intermediate slide rail member 22 in direction away from the mounting plate 11, push the external object in direction toward the mounting plate 11 to move the second intermediate slide rail member 22 relative to the inner slide rail unit 1 and to force the transverse groove 231 of the locating block 23 against the positioning rod 142 of the positioning block 14 so that the positioning block 14 carries the positioning block 13 relative to the inner slide rail 12. When the guide rod 141 of the positioning block 14 touches the first guide face 1214 of the inner slide rail 12 during its movement at this time, the first guide face 1214 of the inner slide rail 12 guides the guide rod 141 into the first sliding groove portion 1212. At this time, the user can release the hand from the external object to release the spring members 161 from constraint for enabling the spring members 161 to push the slide block 13 in direction away from the mounting plate 11. During sliding movement of the slide block 13 in direction away from the mounting plate 11, the first intermediate slide rail 21 is moved by the slide block 13, and the positioning rod 142 of the positioning block 14 carries the second intermediate slide rail 22 (see FIGS. 6 and 7). Further, when the guide rod 141 of the positioning block 14 touches the first guide face 1214 of the inner slide rail 12 is moving from the first sliding groove portion 1212 into the longitudinal sliding groove portion 1211, the positioning rod 142 of the positioning block 14 will be forced away from the transverse groove 231 of the locating block 23 due to an elevation difference between the first sliding groove portion 1212 and the longitudinal sliding groove portion 1211. At this time, the second intermediate slide rail member 22 of the intermediate slide rail unit 2 is released from the constraint of the locating block 23 and moved in direction away from the mounting plate 11 with the external object by the user.

Figure 8:
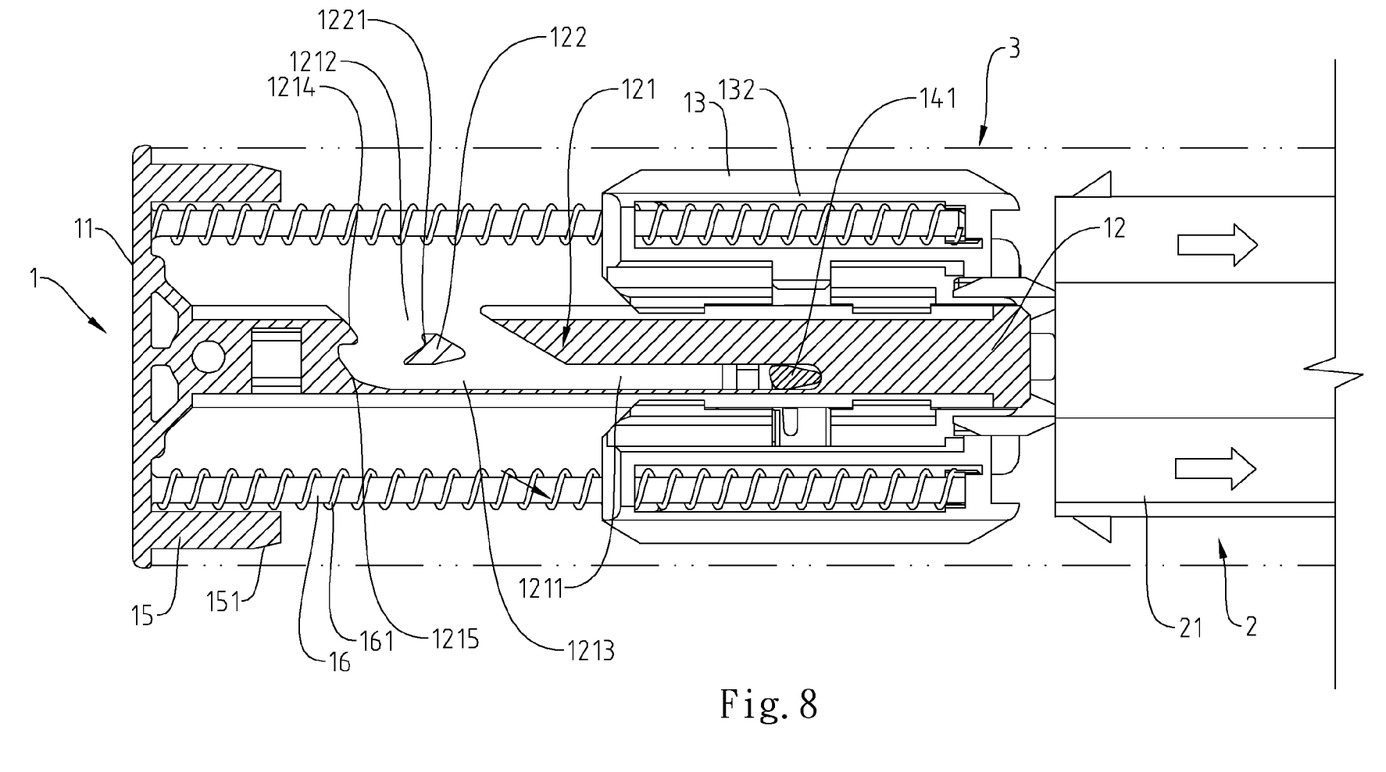
FIG. 8 is a schematic sectional view of the present invention, showing the positioning of the inner slide rail unit when the sliding track assembly opened.
Figure 9:
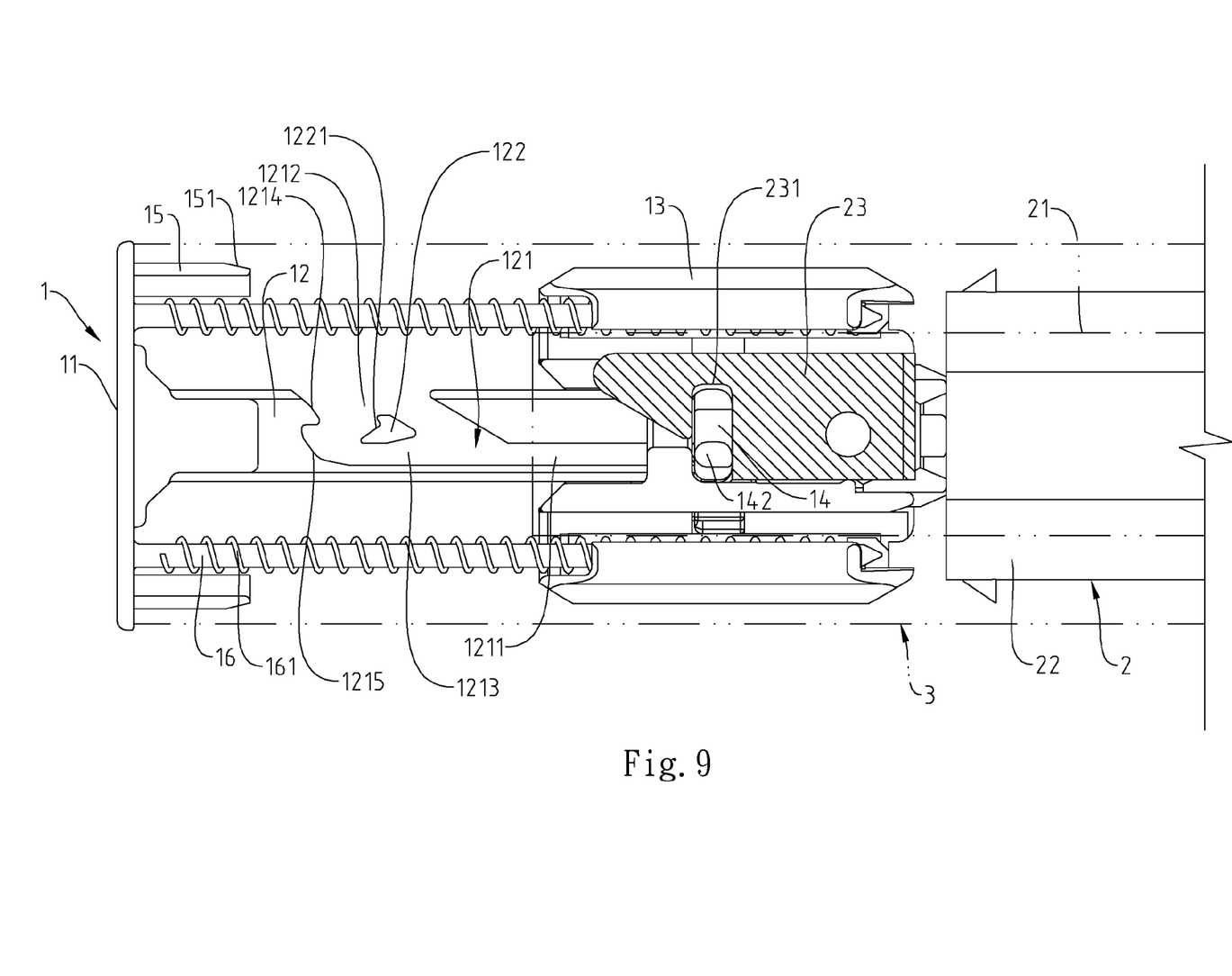
FIG. 9 is a schematic sectional view of the present invention, showing the positioning of the locating plate when the sliding track assembly opened.

Referring to FIGS. 8 and 9, when the user wishes to position the external object in the close position that is close to the mounting plate 11, push the external object toward the mounting plate 11. At this time, the second intermediate rail member 22 is moved toward the mounting plate 11. During the sliding movement of the second intermediate rail member 22 toward the mounting plate 11, the locating block 23 forces the positioning rod 142 of the positioning block 14, causing the positioning block 14 to carry the slide block 13 toward the mounting plate 11. At this time, the guide rod 141 of the positioning block 14 is moved along the longitudinal sliding groove portion 1211 into the second sliding groove portion 1213. When the guide rod 141 of the positioning block 14 touches the second guide face 1215 during its movement in the second sliding groove portion 1213, the positioning rod 142 of the positioning block 14 will be guided by the second guide face 1215 into the transverse groove 231 of the locating block 23, causing the spring members 161 to be compressed by the slide block 13. When the user releases the hand from the external object at this time, the spring members 161 immediately push the slide block 13 in direction away from the mounting plate 11, and therefore the slide block 13 carries the positioning block 14 to force the guide rod 141 into the recessed portion 1221 of the locating block 122 of the inner slide rail 12, securing the external object in position (see FIGS. 4 and 5). Thus, the user can shift the external object between the close position and the open position conveniently.

As stated above, the sliding track assembly of the present invention eliminates the drawbacks of the prior art design subject to the following technical characteristics:

(1) The inner slide rail unit 1 and the intermediate slide rail unit 2 are separately assembled and then respectively inserted into the outer slide rail unit 3. This mounting design facilitates fabrication of the sliding track assembly, saves much installation labor and time, and improves the product yield rate. If the inner slide rail unit 1 or the intermediate slide rail unit 2 is damaged after a long use, the damaged inner slide rail unit 1 or intermediate slide rail unit 2 can be removed from the outer slide rail unit 3 for a replacement.

(2) By means of the functioning of the positioning block 14, the locating block 23 of the intermediate slide rail unit 2 can be positioned in the positioning block 14 to hold the connected external object in position when the sliding track assembly is moved to the close position. Further, when the external object is affixed to the second intermediate slide rail member 22, the slide block 13 does not hinder movement of the external object, and the external object can be kept close to the mounting plate 11 when the sliding track assembly is closed. Therefore, this design effectively prolongs the travel path of the external object.

Although a particular embodiment of the invention has been described in detail for purposes of illustration, various modifications and enhancements may be made without departing from the spirit and scope of the invention.

What is claimed is:

1. A sliding track assembly, comprising:
an inner slide rail unit, said inner slide rail unit comprising a mounting plate, an inner slide rail perpendicularly extended from an inner side of said mounting plate, said inner slide rail having a circulating guide groove, a slide block supported on and movable along said inner slide rail, said slide block having a locating hole, and a positioning block set between said slide block and said inner slide rail and repeatedly pressable to position in a predetermined position in said circulating guide groove and to slide in said circulating guide groove, said positioning block having a guide rod protruded from one side thereof and coupled to said circulating guide groove of said inner slide rail and a positioning rod protruded from an opposite side thereof and inserted through said locating hole of said slide block; and
an intermediate slide rail unit supported on one end of said slide block opposite to said mounting plate, said intermediate slide rail unit comprising a first intermediate slide rail member movable by said slide block, a second intermediate slide rail member mounted in said first intermediate slide rail member and a locating plate mounted in said second intermediate slide rail member adjacent to said slide block, said locating plate having a transverse groove for receiving said positioning rod of said positioning block to hold said positioning block in position;
wherein said circulating guide groove has a longitudinal sliding groove portion extending longitudinally in a direction reversed to said mounting plate and a first sliding groove portion and a second sliding groove portion respectively extending from one end of said longitudinal sliding groove portion in a direction towards said mounting plate and then merged into each other; said inner slide rail further having a locating block protruding from one side thereof and surrounded by said first sliding groove portion and said second sliding groove portion, said locating block having a recessed portion facing said mounting plate, and a first guide face and a second guide face respectively disposed in said first sliding groove portion and said second sliding groove portion adjacent to the merged area between said first sliding groove portion and said second sliding groove portion.

2. The sliding track assembly as claimed in claim 1, wherein said inner slide rail unit and said intermediate slide rail unit are mounted in an outer slide rail unit; said inner slide rail unit comprises two locating bars perpendicularly extended from said mounting plate in a parallel member at two opposite lateral sides relative to said inner slide rail and respectively inserted into the inside of said outer slide rail unit and tightly abutted against two opposite sidewalls of said outer slide rail unit, each said locating bar having a guide face to facilitate insertion of the respective locating bar into said outer slide rail unit.

3. The sliding track assembly as claimed in claim 1, wherein said inner slide rail unit further comprises two guide rods respectively extended from said mounting plate in a parallel manner at two opposite lateral sides relative to said inner slide rail, and two spring members respectively sleeved onto said guide rods and stopped between said mounting plate and said slide block; said slide block has two sliding grooves respectively coupled to said guide rods to guide movement of said slide block along said guide rods.

* * * * *